N. E. BADGLEY.
Cotton-Planter.

No. 28,049.  Patented May 1, 1860.

WITNESSES:
A. Hill
L. L. Smith

INVENTOR:
N. E. Badgley
per Geo. Pattee Atty.

UNITED STATES PATENT OFFICE.

N. E. BADGLEY, OF GADSDEN, ALABAMA.

IMPROVEMENT IN COTTON-SEED PLANTERS.

Specification forming part of Letters Patent No. 28,049, dated May 1, 1860.

*To all whom it may concern:*

Be it known that I, N. E. BADGLEY, of Gadsden, in the county of Cherokee and State of Alabama, have invented a new and useful Improvement in Cotton-Seed Planters; and I do hereby declare that the following is a full, clear, and exact description of the same, reference being had to the annexed drawings, forming part of this specification, in the several figures of which similar characters of reference denote the same part.

Figure 1:
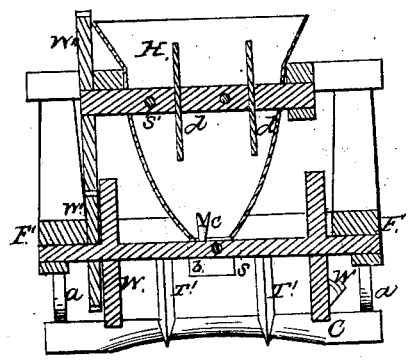
Figure 2:
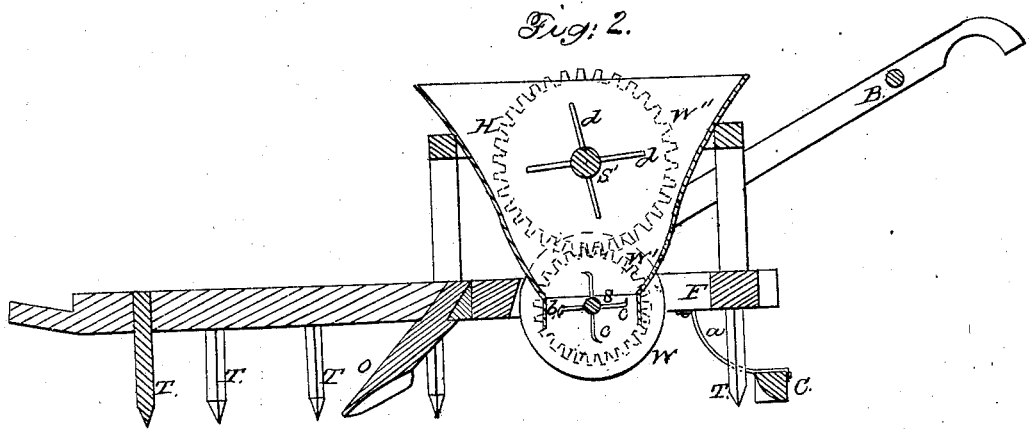

Figure 1 is a vertical longitudinal section of the machine. Fig. 2 is a cross-section through axes of shafts S S'.

The nature of this invention consists in the construction of cotton-seed planters with certain devices hereinafter to be set forth.

In the drawings, F is the frame supporting the hopper H, and having upon its under surface the harrow-teeth T in front of the hopper, and two teeth, T', in rear thereof. Behind these latter teeth is the spring-coverer C, consisting of a hollowed bar attached to the frame by springs $a\ a$. The hopper H is slotted at bottom, with a pendent mouth-piece, $b$, within which revolves the shaft S, armed with bent bifurcated hooks $c$, for drawing the seed through the mouth-piece and discharging the same into the furrow made by the opener O. The rotation of shaft S is produced by revolution of wheels W, attached thereto, by the forward movement of the machine. This shaft also carries gear-wheel W', meshing with wheel W'' on shaft S', which latter shaft extends through the hopper and is armed with stirrers $d\ d$, which force the seed to fall to the lower portion of the hopper as shaft S' rotates.

The operator governs the machine by means of handles B.

The operation of the machine is as follows: The hooks $c$ draw the seed from the hopper, causing them to fall into the furrow, the teeth T' throw earth upon the seed, and the spring-coverer completes the operation.

I claim—

The arrangement of the bent bifurcated hooks $c\ c$, slot $b$ of hopper-bottom shafts S and S', opener O, teeth T', and spring-coverer C, substantially as hereinbefore shown and described.

In testimony whereof I have hereunto signed my name before two subscribing witnesses.

N. E. BADGLEY.

Witnesses:
GEO. PATTEN,
JOHN S. HOLLINGSHEAD.